(12) United States Patent
Seto et al.

(10) Patent No.: US 8,379,109 B2
(45) Date of Patent: Feb. 19, 2013

(54) IMAGE PROCESSING APPARATUS

(75) Inventors: Akira Seto, Osaka (JP); Michihiko Otsuka, Osaka (JP)

(73) Assignee: Panasonic Corporation, Osaka (JP)

( * ) Notice: Subject to any disclaimer, the term of this patent is extended or adjusted under 35 U.S.C. 154(b) by 158 days.

(21) Appl. No.: 12/965,100

(22) Filed: Dec. 10, 2010

(65) Prior Publication Data

US 2011/0141307 A1 Jun. 16, 2011

(30) Foreign Application Priority Data

Dec. 14, 2009 (JP) ................................. 2009-282508

(51) Int. Cl.
*H04N 5/76* (2006.01)
*H04N 5/80* (2006.01)

(52) U.S. Cl. .................. 348/231.3; 348/231.2; 386/248; 386/241

(58) Field of Classification Search ................ 348/231.4, 348/231.5, 231.2, 231.3
See application file for complete search history.

(56) References Cited

U.S. PATENT DOCUMENTS

| | | | | |
|---|---|---|---|---|
| 8,086,089 B2 * | 12/2011 | Murakami | .................... | 386/241 |
| 2004/0019597 A1 * | 1/2004 | Nishimura | .................... | 707/100 |
| 2004/0208380 A1 * | 10/2004 | Aoki et al. | .................... | 382/232 |
| 2007/0269192 A1 * | 11/2007 | Sato | .............................. | 386/126 |
| 2008/0131091 A1 * | 6/2008 | Mae et al. | .................... | 386/124 |
| 2009/0028530 A1 * | 1/2009 | Yamada et al. | ................ | 386/124 |
| 2009/0310930 A1 * | 12/2009 | Morimoto et al. | .............. | 386/52 |

FOREIGN PATENT DOCUMENTS

| | | |
|---|---|---|
| JP | 2003-319328 | 11/2003 |
| JP | 2004-254133 | 9/2004 |
| JP | 2006-173892 | 6/2006 |
| JP | 2007-312006 | 11/2007 |
| JP | 2008-47985 | 2/2008 |
| JP | 2008-84213 | 4/2008 |

* cited by examiner

*Primary Examiner* — Tuan Ho
*Assistant Examiner* — Shahbaz Nazrul
(74) *Attorney, Agent, or Firm* — Panasonic Patent Center

(57) ABSTRACT

An image processing apparatus includes a reproduction condition generator configured to generate a reproduction condition of an image file, a reproduction condition recording unit configured to record the reproduction condition to a management file which is different from the image file while associating the reproduction condition with the image file, and a reproduction unit for reproducing an image file while controlling a reproduction method of the image file based on the reproduction condition associated with the image file. The reproduction condition is information representing at least one of image quality adjustment, volume adjustment, display magnification rate, and reproduction speed adjustment.

10 Claims, 7 Drawing Sheets

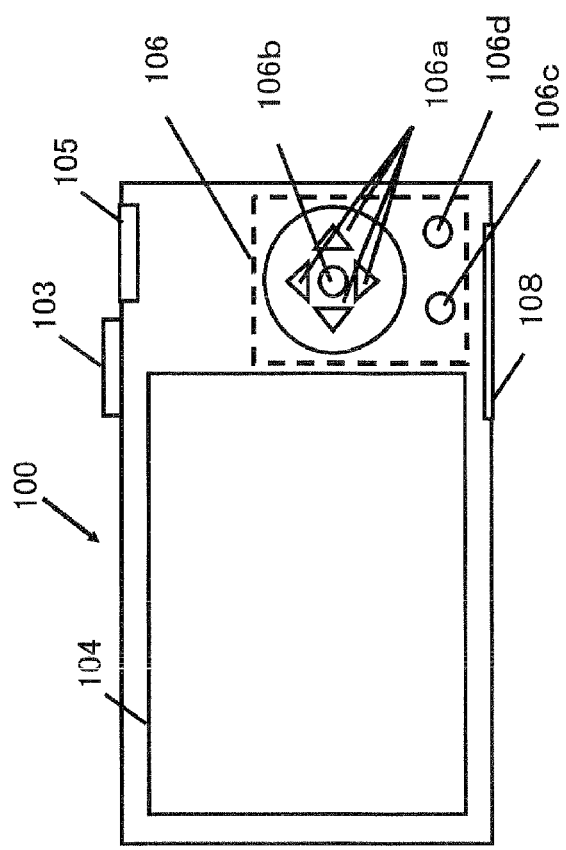
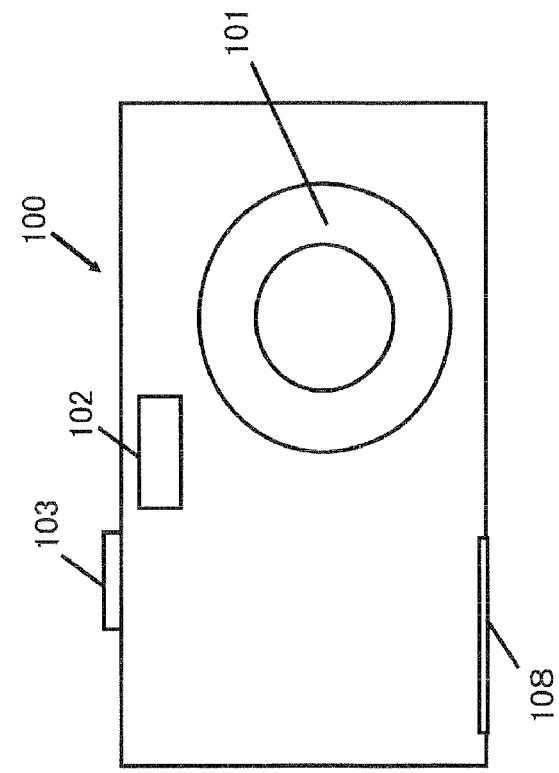
Fig. 1A
Fig. 1B

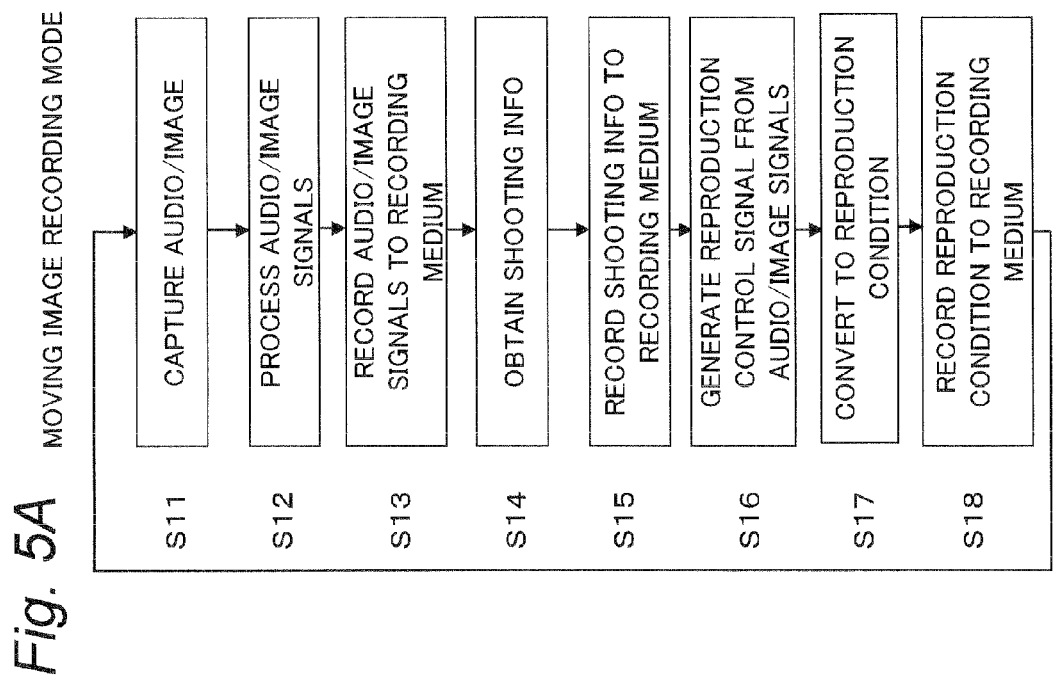

IMAGE PROCESSING APPARATUS

BACKGROUND

1. Technical Field

The technical field relates to an image processing apparatus for controlling reproduction of an image file based on a management file and an image processing apparatus for generating the management file.

2. Related Art

Imaging apparatuses such as a digital camera are widely prevalent these days. The imaging apparatus can record a still image and a moving image in various formats to a recording medium such as a memory card. For example, a digital camera can record not only a still image but also a moving image defined by AVCHD (Advanced Video Codec High Definition) standard.

In some specifications for moving image recording such as AVCHD standard, a stream file (moving image file) and a navigation file (management file) are recorded. The stream file includes a main body of a moving image. The navigation file includes supplementary information of the moving image. For example, according to the AVCHD standard, an extension information region is provided in the navigation file. Recording conditions with which a moving image has been taken are recorded to the extension information region.

On the other hand, when a recorded moving image is reproduced, it is desired to reproduce the moving image in a manner suitable for the characteristics of a moving image reproduction apparatus. JP2004-254133A is a prior art document for realizing this demand. JP2004-254133A provides a moving image reproduction system for sending a moving image from an image transmission apparatus to a moving image reproduction apparatus according to settings of display size, display range, image quality, color component, and frame rate of the moving image reproduction apparatus.

A moving image recording/reproduction apparatus has been developed, which records information about a shutter speed and an aperture for shooting of a moving image in the same manner as recording of Exit information of a still image, so that the recorded information can be used as shooting information for reproduction and editing.

In the moving image reproduction system as described in JP2004-254133A, it is not considered that reproduction conditions are moved when a moving image file is moved to another apparatus or another recording medium, thus resulting in inconvenience for the user. In a moving image recording/reproduction apparatus which records shooting information, the recorded shooting information alone is often insufficient to realize reproduction desired by a user, and the user is dissatisfied with the settings of the reproduction conditions. For example, with only the shooting information, it is difficult to reflect a desire of a user to enlarge only a particular subject only for a particular period for moving image reproduction.

As an example of a method for reflecting a user's desire about reproduction, there is a method for editing a stream file to reflect the user's desire and thereafter restructuring the stream file by re-encoding the stream file. However, for the AVCHD standard, a high computing performance is necessary to restructure the stream file, and it takes too much time and large load for a CPU used in an embedded device to restructure the stream file.

When the stream file is edited as well as restructured, one stream file is generated per one editing. Therefore, when the stream file is edited multiple times with different reproduction conditions, multiple stream files are generated, which requires a large storage capacity of the recording medium.

SUMMARY

To solve the above problems, an image processing apparatus is provided that can set reproduction conditions for image reproduction without restructuring an image file.

In a first aspect, an image processing apparatus is provided, which includes a reproduction condition generator configured to generate a reproduction condition of an image file, a reproduction condition recording unit configured to record the reproduction condition to a management file which is different from the image file while associating the reproduction condition with the image file, and a reproduction unit for reproducing an image file while controlling a reproduction method of the image file based on the reproduction condition associated with the image file. The reproduction condition is information representing at least one of image quality adjustment, volume adjustment, display magnification rate, and reproduction speed adjustment.

In a second aspect, a computer-readable recording medium is provided. The computer-readable recording medium stores an image processing program for causing a computer to execute the functions of generating a reproduction condition of an image file, recording the reproduction condition to a management file which is different from the image file while associating the reproduction condition with the image file, and reproducing an image file while controlling a reproduction method of the image file based on the reproduction condition associated with the image file. The reproduction condition is information representing at least one of image quality adjustment, volume adjustment, display magnification rate, and reproduction speed adjustment.

According to the above aspects, the reproduction condition used during image reproduction is recorded to the management file, which is different from the moving image file. In this configuration, the reproduction condition for image reproduction can be set without restructuring the image file.

BRIEF DESCRIPTION OF DRAWINGS

FIGS. 1A to 1B are external views illustrating a digital camera according to an embodiment.

FIGS. 5A to 5B are flowcharts illustrating a first exemplary operation of a digital camera according to the embodiment.

DETAILED DESCRIPTION OF PREFERRED EMBODIMENT

First Embodiment

Figure 2:
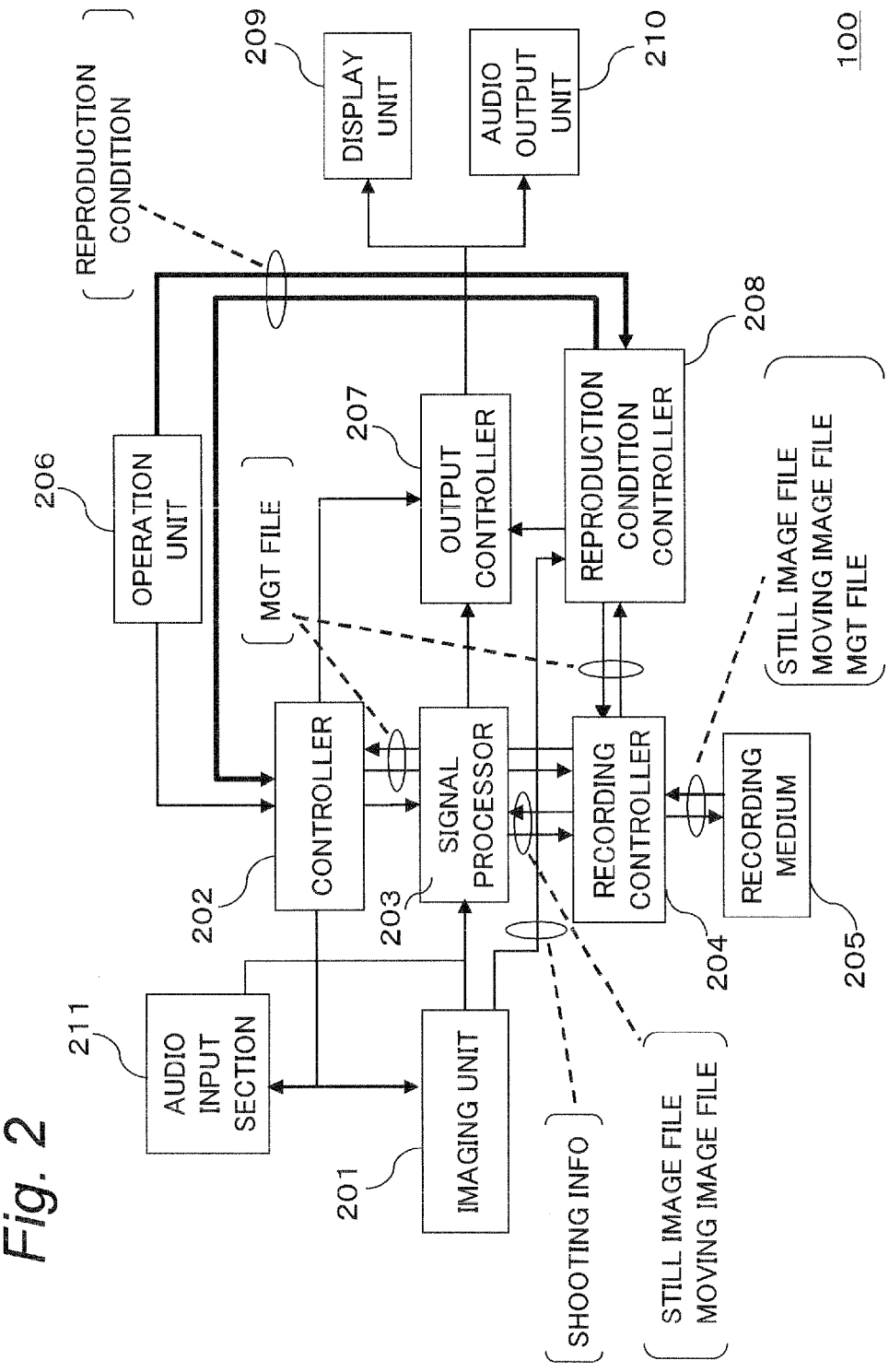
FIG. 2 is a block diagram illustrating the digital camera according to the embodiment.

A digital camera according to an embodiment will be hereinafter explained with reference to attached drawings.

1. Configuration of Digital Camera 1.1 External Appearance

FIG. 1 is an external view illustrating a digital camera according to an embodiment. FIG. 1A is a front view, and FIG. 1B is a back view. A digital camera 100 according to the embodiment can record not only a still image but also a moving image defined by AVCHD standard. Further, the digital camera 100 can reproduce a still image and a moving image. The digital camera 100 includes, as operation mode, a reproduction mode for reproducing a still image and a moving image and a recording mode for shooting a still image and a moving image. Further, the digital camera 100 includes, as recording mode, a still image recording mode for recording a still image and a moving image recording mode for recording a moving image.

On the front surface of the digital camera 100, an imaging optical system 101 and a flash 102 are arranged. The imaging optical system 101 forms a subject image on an imaging device provided in the digital camera 100. In the still image recording mode, the flash 102 compensates the lack of light for shooting by emitting a flash when a picture is taken in a dark place.

A shutter button 103 is arranged on an upper surface of the digital camera 100. When the shutter button 103 is pressed down in the still image recording mode, an electric signal based on an optical image formed on the imaging device is recorded as a still image file to a recording medium such as a memory card.

When the shutter button 103 is pressed down in the moving image recording mode, recording of a moving image file is started. In other words, an electric signal based on an optical image formed on the imaging device is successively recorded to the recording medium as a moving image file. Afterward when the shutter button 103 is pressed down again, recording of the moving image file is terminated. At the same time, a management file is recorded to the recording medium. More specifically, when there is no management file on the recording medium, a new management file is generated on the recording medium. When the management file already exists on the recording medium, the management file is updated with additional information.

The management file stores shooting time, profile information of a moving image file, and the like. The management file has an area that can be used as an extension information area, in which shooting information such as a shutter speed and an aperture value can be recorded. According to the digital camera 100 according to the present embodiment, information about reproduction conditions can be recorded to the extension information area of the management file.

On the lower surface of the digital camera 100, a slot 108 for attaching a recording medium is arranged. When the digital camera 100 is used to take a still image and a moving image, the still image file and the moving image file are respectively stored to different folders in the recording medium.

As shown in FIG. 1B, a liquid crystal display monitor 104, a mode dial 105, various kinds of operation buttons 106 are arranged on the back surface of the digital camera 100. In the still image recording mode or the moving image recording mode, the liquid crystal display monitor 104 successively displays images based on optical images formed on the imaging device. Therefore, a user can decide a composition of a picture while checking the image displayed on the liquid crystal display monitor 104. In the reproduction mode, the liquid crystal display monitor 104 can display a still image based on a still image file recorded in the recording medium or a moving image based on a moving image file recorded in the recording medium.

The mode dial 105 is a dial switch for switching the still image recording mode, the moving image recording mode, and the reproduction mode. Operating the mode dial 105 can determine an operation mode of the digital camera 100. As described above, the operation modes of the digital camera 100 include the still image recording mode, the moving image recording mode, and the reproduction mode.

The still image recording mode is an operation mode in which an electric signal based on an optical image formed on the imaging device is recorded to the recording medium as a still image file, when the shutter button 103 is pressed down.

The moving image recording mode is an operation mode in which the electric signal based on optical images formed on the imaging device are successively recorded to the recording medium as a moving image file from when the shutter button 103 is pressed down and to when the shutter button 103 is pressed down again.

The reproduction mode is an operation mode in which the liquid crystal display monitor 104 displays a still image based on a still image file and a moving image based on a moving image file recorded in the recording medium. In the reproduction mode, the liquid crystal display monitor 104 can display thumbnail images of still image files and thumbnail images of representing images of moving image files in parallel in the order of the date and time when the image was shot. The display can be switched by selecting a thumbnail image displayed on the liquid crystal display monitor 104. More specifically, when a thumbnail image of a still image file is selected, the liquid crystal display monitor 104 displays a still image based on the selected still image file. When a thumbnail image of a representing image of a moving image file is selected, the liquid crystal display monitor 104 reproduces a moving image based on the selected moving image file.

When a moving image is reproduced, reproduction of a moving image file associated with a management file can be controlled based on information about reproduction condition recorded in the management file. The reproduction condition is set associated with the moving image file, and includes information for controlling reproduction of all or a portion of image and/or sound in reproduction of the moving image file (i.e., image data and audio data included in the moving image file). For example, the reproduction condition includes information indicating zoom process, change of display angle, color correction, brightness correction, volume correction and change of reproduction speed with respect to all or a portion of image and/or sound.

Various kinds of operation buttons 106 include a menu button 106b for displaying a menu screen on the liquid crystal display monitor 104, a cursor button 106a for moving a cursor up/down and to the left/right to select an item in the menu screen, a set button 106b (shared with the menu button 106b) for instructing a decision of an item at which the cursor resides in the menu screen, a display switch button 106c for switching an OSD (On Screen Display) item on the liquid crystal display monitor 104, and an deletion button 106d for instructing erasure of an unnecessary still or moving image file. When the moving image file is deleted, the management file is updated according to the deletion.

Further, detailed settings can be made in the still image recording mode, the moving image recording mode, and the reproduction mode by selecting these operation buttons 106. In particular, in the reproduction mode, information about reproduction condition can be set in association with a moving image file by operating the various kinds of operation buttons 106. Information about a plurality of reproduction conditions can be associated with and set to one image file. The information about reproduction condition thus set is recorded to the management file. Further, the information about reproduction condition thus set can be copied, deleted, and updated.

1.2 Internal Structure

FIG. 2 is a block diagram illustrating the digital camera 100 according to present embodiment. In the digital camera according to the present embodiment, a memory card is used as a recording medium 205.

An operation unit 206 outputs a user's instruction to a controller 202. The controller 202 controls an imaging unit 201, a signal processor 203, an output controller 207, and a recording controller 204 according to the user's instruction output from the operation unit 206 to execute process such as recording and reproduction of a still image and a moving image.

For example, a display unit 209 is constituted by the liquid crystal display monitor 104. The display unit 209 displays an image based on an optical image formed on the imaging device, reproduced images of still image files and moving image files recorded in the recording medium 205, and a menu screen on which settings about recording and reproduction are made.

An audio output unit 210 includes a speaker, which outputs sounds input via an audio input unit 211 and sounds reproduced from a moving image file recorded in the recording medium 205. The output controller 207 controls display of the display unit 209 and audio output of the audio output unit 210.

The imaging unit 201 is constituted by an imaging device such as a CCD (Charge Coupled Device), and converts an optical image into an electric signal according to an instruction provided by the controller 202 to output the electric signal to the signal processor 203. The audio input unit 211 converts an input sound into an audio signal to output the audio signal to the signal processor 203.

In the moving image recording mode, the signal processor 203 performs compression process such as MPEG (Moving image Experts Group) compression on electric signals successively output from the imaging unit 201, and outputs a compressed moving image file to the recording controller 204.

Further, in the still image recording mode and the moving image recording mode, the signal processor 203 converts electric signals successively output from the imaging unit 201 into a signal which can be displayed by the display unit 209 such as a YC signal, and outputs the converted signal to the output controller 207.

Further, in the reproduction mode, the signal processor 203 decompresses a still image file in the recording medium 205 output from the recording controller 204, and outputs the decompressed still image file to the output controller 207. The signal processor 203 decompresses a moving image file in the recording medium 205 output from the recording controller 204, and outputs the moving image file to the output controller 207.

In the still image recording mode and the moving image recording mode, the signal processor 203 performs a predetermined signal processing on electric signals successively output from the audio input unit 211, and outputs the electric signals to the output controller 207. In the reproduction mode, the signal processor 203 decompresses an audio signal included in a moving image file stored in the recording medium 205, and outputs the decompressed audio signal to the output controller 207.

The recording controller 204 records a still image file or a moving image file output from the signal processor 203 to the recording medium 205. The recording controller 204 also reads a still image file or a moving image file from the recording medium 205 according to an instruction given by the controller 202, and outputs the read still image file or the read moving image file to the signal processor 203. Further, the recording controller 204 reads the management file in the recording medium 205 according to an instruction given by the controller 202, outputs the read management file to the controller 202.

In the moving image recording mode, the reproduction condition controller 208 obtains shooting information for shooting at shooting of the image from the imaging unit 201, and converts a format of the shooting information into a format of management file. Further, the reproduction condition controller 208 associates the shooting information in the management file format with the moving image file through the recording controller 204 which then records the shooting information and the moving image file to the recording medium 205. When a moving image is reproduced in the reproduction mode, the reproduction condition controller 208 obtains the shooting information for shooting at shooting of the image from the management file read from the recording medium 205 by the recording controller 204, and displays the obtained shooting information on the display unit 209 via the output controller 207.

In the reproduction mode, the reproduction condition controller 208 obtains from the operation unit 206 information about reproduction condition for moving image reproduction which is set in and is associated with the moving image file, and converts a format of the obtained information to the management file format. Then, the reproduction condition controller 208 associates the information about reproduction condition in the management file format with the moving image file, and causes the recording controller 204 to record the information to the recording medium 205. During reproduction of a moving image in the reproduction mode, when the information about reproduction condition associated with the moving image file which is selected to be reproduced is recorded in the management file, the reproduction condition controller 208 obtains the information about reproduction condition from the management file read from the recording medium 205, and outputs the obtained information to the controller 202. The controller 202 controls the signal processor 203 and the output controller 207 according to the information about reproduction condition.

2. Folder Structure

Figure 3:
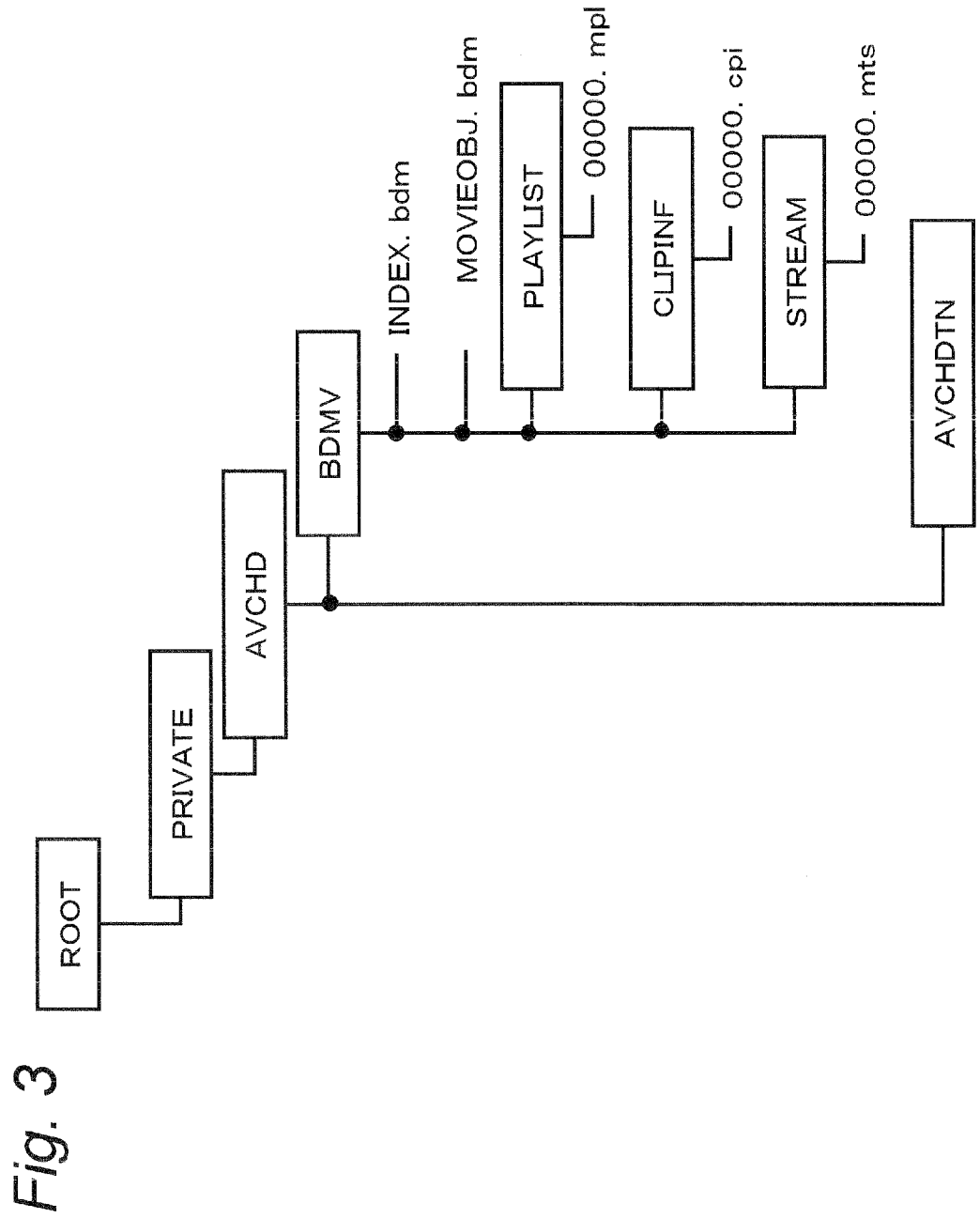
FIG. 3 is a figure illustrating a folder structure in a recording medium.

FIG. 3 is a diagram illustrating a folder structure in the recording medium 205. In the figure, a folder name is enclosed with a box, but a filename is not enclosed with a box. PRIVATE folder is created under ROOT folder. DCIM folder storing still image files is also created under ROOT folder. However, DCIM folder is not shown in FIG. 3. DCIM folder is a folder defined by DCF (Design rule for Camera File system) standard, and stores recorded still image files.

AVCHD folder is created under PRIVATE folder. BDMV folder is created under AVCHD folder.

STREAM folder is created under BDMV folder. STREAM folder stores moving image files. 00000.mts file is a moving image file.

CLIPINF folder is further created under BDMV folder. CLIPINF folder stores clip information files. 00000.cpi file is a clip information file. The clip information file corresponds to the moving image file, and includes information for the corresponding moving image file such as a shooting time.

PLAYLIST folder is further created under BDMV folder. PLAYLIST folder stores a playlist file. 00000.mpl file is a playlist file. The playlist file includes information such as indication of moving image file to be reproduced, a reproduction start point of the moving image file, and a reproduction end point of the moving image file. The reproduction of the moving image file is controlled based on the playlist file.

Figure 4:
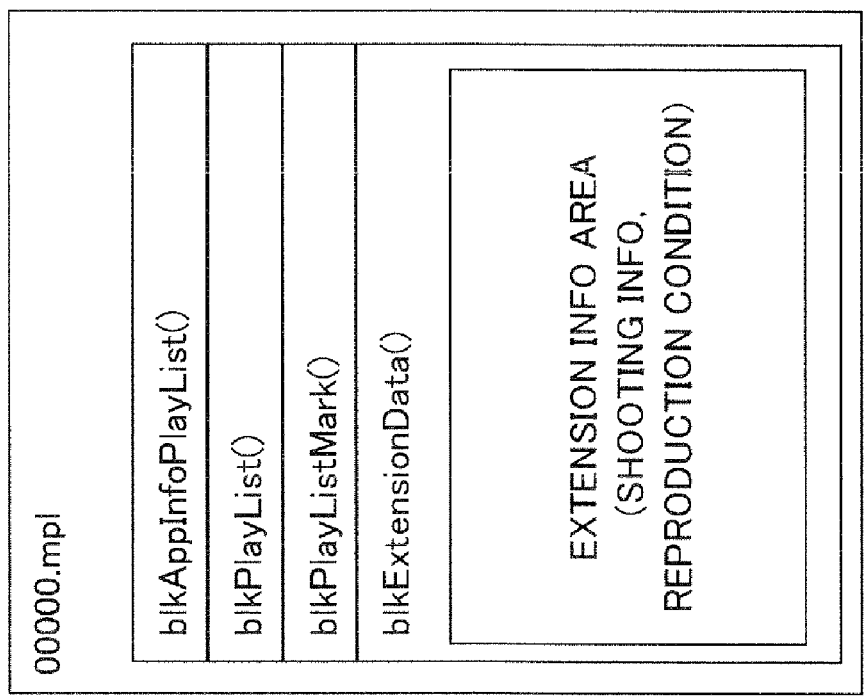
FIG. 4 is a figure illustrating a configuration of a playlist file.

FIG. 4 illustrates a detailed structure of a playlist file. The playlist file includes a block "blkAppInfoPlayList( )", a block "blkPlayList ( )", a block "blkPlayListMark( )", and a block "blkExtensionData( )".

The block "blkAppInfoPlayList( )" includes information such as type of a playlist file and a reproduction constraint. The block "blkPlayList( )" includes play list information. The block "blkPlayListMark( )" includes track marks, i.e., points to which reproduction jumps for track jump. The block "blkExtensionData( )" includes extension data about a playlist file. In the block "blkExtensionData( )" of a playlist file, an area called "MakersInformation" having a fixed length of 128 bit and an area called "MakersPrivateData" having a variable length are defined as extension information area. In this area, shooting information of the moving image file is often recorded. In the digital camera 100 according to the present embodiment, Makers Information area or MakersPrivateData area includes information about reproduction condition associated with the moving image file.

Returning to FIG. 3, BDMV folder stores INDEX.bdm file, MOVIEOBJ.bdm file, and AVCHDTN folder. Explanation of these is omitted.

3. Operation

Exemplary operations of the digital camera 100 according to the present embodiment will be explained below.

3.1. First Example of Operation

The first example of operation performed by the digital camera 100 according to the present embodiment will be explained with reference to FIGS. 5A and 5B.

3.1.1 Operation of Moving Image Recording Mode

The flowchart of FIG. 5A illustrates process of the digital camera 100 for recording image/audio signals in the moving image recording mode according to the first example of operation.

In this process, the image/audio signals are analyzed simultaneously with the recording of the image/audio signals to extract a control signal for achieving appropriate reproduction (hereinafter referred as "reproduction control signal") (S16). The extracted reproduction control signal is converted into information about reproduction condition (S17), and the extracted reproduction control signal is recorded to the recording medium 205 (S18).

More specifically, the imaging unit 201 captures an image and generates an image signal. At the same time, the audio input unit 211 generates an audio signal from a captured sound (S11). The signal processor 203 performs predetermined signal processing on the generated image/audio signals (S12), and records the processed image/audio signals to the recording medium 205 with the recording controller 204 (S13). The reproduction condition controller 208 obtains shooting information from the imaging unit 201 (S14), and records the shooting information to the recording medium 205 (S15). Further, the reproduction condition controller 208 analyzes the generated image/audio signals, and generates the reproduction control signal for appropriate reproduction (S16). The reproduction condition controller 208 converts the generated reproduction control signal into information about reproduction condition (S17), and records the information about reproduction condition to the recording medium 205 (S18).

In this case, the processes of capturing the image/audio (S11), processing the image/audio signals (S12), recording the image/audio signals to the recording medium 205 (S13), obtaining the shooting information (S14), and recording the shooting information to the recording medium 205 (S15) are generally known processes performed by a conventional moving image recording/reproducing apparatus. The digital camera 100 according to the present embodiment is characterized in generating a reproduction control signal from image/audio signals (S16), converting the reproduction control signal into information about reproduction condition (S17), and recording the information about reproduction condition to the recording medium 205 separately from the shooting information (S18).

The generation of the reproduction control signal (S16) and the conversion of the information about reproduction condition (S17) will be hereinafter explained in detail. For example, when a person's face is detected in an image signal from one point of time to another point of time, a reproduction control signal is generated to indicate that a person's face is included in the image signal from the one point of time to the another point of time. This reproduction control signal is converted into information about reproduction condition for performing color correction so as to reproduce beautiful flesh color from the one point of time to the another point of time. When wind noise is detected in an audio signal from one point of time to another point of time, a reproduction control signal is generated to indicate that wind noise is included in the audio signal from the one point of time to the another point of time. This reproduction control signal is converted into information about reproduction condition for setting the volume of reproduction to a predetermined level or less from the one point of time to the another point of time. When the difference between the maximum value and the minimum value of the audio signal level is larger than a predetermined value, a reproduction control signal to indicate the fact is generated. This reproduction control signal is converted into information about reproduction condition for keeping the level of the volume of reproduction constant throughout reproduction time of the audio signal (i.e., reproduction condition for reducing the volume while the level of the original audio signal is larger than a first predetermined value, and increasing the volume while the level of the original audio signal is less than a second predetermined value (which is less than the first predetermined value)). When the brightness of the image signal is detected to be higher than a predetermined value (or lower than a predetermined value), a reproduction control signal is generated to indicate that the brightness of the image signal is higher than the predetermined value (or lower than the predetermined value) from one point of time to another point of time. This reproduction control signal is converted into information about reproduction condition for reducing (or increasing) the brightness from one point of time to another point of time (S17).

3.1.2 Operation in Reproduction Mode

Process of the digital camera 100 for reproducing a moving image in the reproduction mode according to the first example of operation will be explained with reference to the flowchart of FIG. 5B.

When a moving image is reproduced in the reproduction mode, the recording controller 204 reads the image/audio signals from the recording medium 205 (S21). The reproduction condition controller 208 reads, from the recording medium 205 (management file), information about reproduction condition associated with the moving image to be reproduced (S22). The controller 202 controls the signal processor 203 and the output controller 207 according to the read information about reproduction condition to reproduce the image/audio signals (S23).

For example, when the reproduction condition indicates performing color correction so as to reproduce beautiful flesh color from a time t1 to a time t2, the controller 208 controls the signal processor 203 and the output controller 207 according to the reproduction condition to perform color correction so as to reproduce beautiful flesh color from the time t1 to the time t2. As a result, an image subjected to color correction from the time t1 to the time t2 is displayed on the display unit 209. On the other hand, when the reproduction condition indicates setting the volume of reproduction to a predetermined level from the time t1 to the time t2, the controller 208 controls the signal processor 203 and the output controller 207 according to the reproduction condition to set the volume of reproduction to the predetermined level from the time t1 to the time t2. As a result, a sound at the predetermined volume level is output from the audio output unit 210 from the time t1 to the time t2.

The controller 202 controls the output controller 207 to display shooting information on the display unit 209 during reproduction of a moving image (S24). It should be noted that the shooting information is not necessarily displayed on the display unit 209.

3.2 Second Example of Operation

Figure 6C:
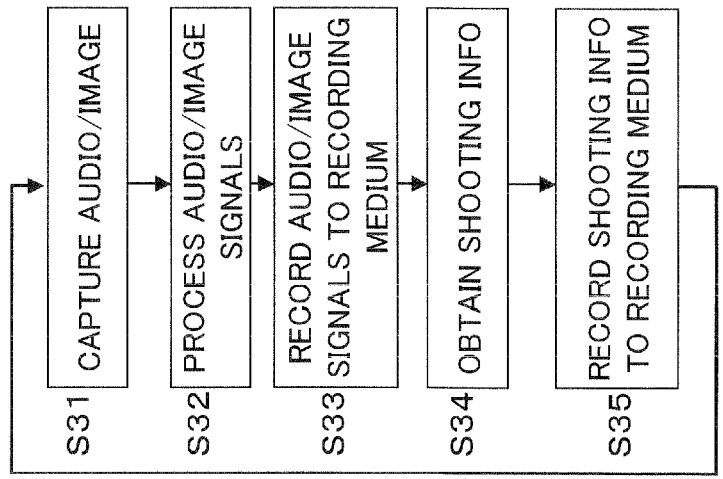
FIGS. 6A to 6C are flowcharts illustrating a second exemplary of operation of a digital camera according to the embodiment.
Figure 6B:
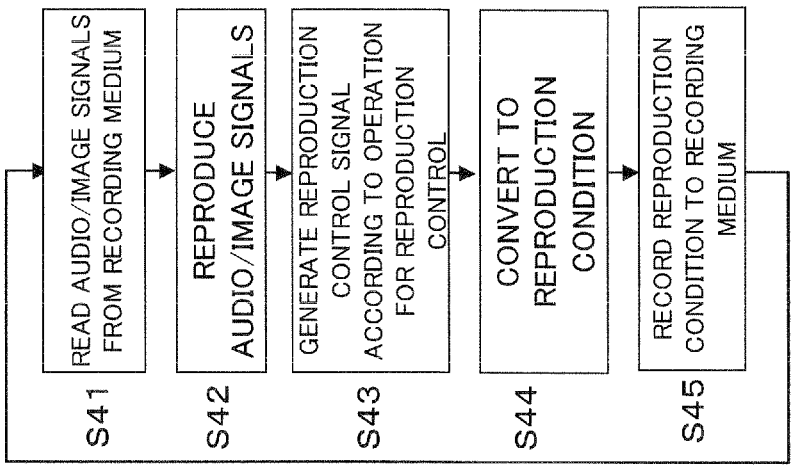
Figure 6A:
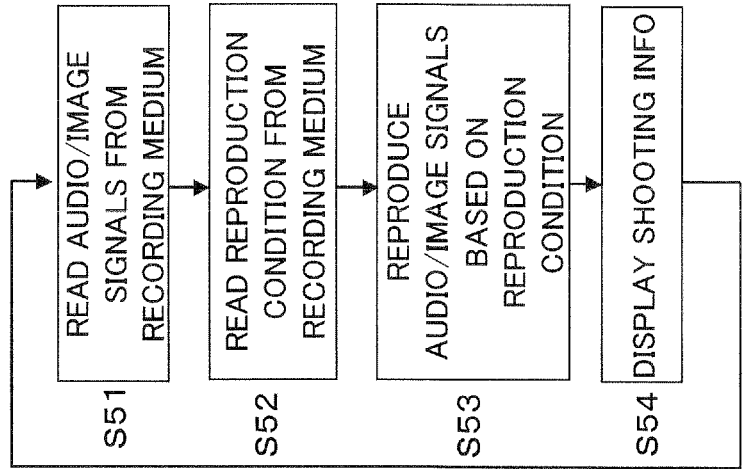

The second example of operation performed by the digital camera 100 according to the present embodiment will be explained with reference to the flowcharts of FIGS. 6A to 6C. In the process as shown in the flowcharts of FIGS. 6A to 6C, information about reproduction condition is not recorded when image/audio signals are recorded to the recording medium 205 in the moving image recording mode. Instead, in the reproduction mode, a signal representing user's operation for reproduction, such as zoom operation particularly performed during reproduction of a moving image is extracted as a reproduction control signal (S43), the extracted reproduction control signal is converted into information about reproduction condition (S44), and the information about reproduction condition is recorded to the recording medium 205 (S45).

3.2.1 Operation of Moving Image Recording Mode

The flowchart of FIG. 6A illustrates process of the digital camera 100 for recording image/audio signals in the moving image recording mode according to the second example of operation. Steps S31 to S35 of the flowchart of FIG. 6A respectively correspond to steps S11 to S15 of the flowchart of FIG. 5A. The detailed explanation is already made, and therefore the description thereabout is omitted here. It should be noted that the second example of operation is different from the first example of operation in that information about reproduction condition is neither generated nor recorded in the moving image recording mode.

3.2.2 Recording Operation of Reproduction Condition in Reproduction Mode

FIG. 6B illustrates process of a digital camera 100 for recording reproduction condition the reproduction mode according to the second example of operation will be explained with reference to the flowchart of FIG. 6B.

When a moving image is reproduced in the reproduction mode, the recording controller 204 reads the image/audio signals from the recording medium 205 (S41), and the read image/audio signals are reproduced (S42). Thereafter, when a user performs an operation for controlling reproduction (for example, zoom operation for enlarging or reducing a displayed image), the reproduction controller 202 receives a signal for instructing the content of the operation via the controller 202, and generates a reproduction control signal for appropriately reproducing the signal according to the content of the signal for instructing the content of the operation (S43). Then, the reproduction controller 202 converts the reproduction control signal into information about reproduction condition (S44), and records the information to the recording medium 205 (S45).

For example, when the user performs zoom operation for enlarging or reducing a display image as an operation for reproduction control during moving image reproduction in the reproduction mode, a reproduction control signal is generated to indicate that the user performed the zoom operation from one point of time to another point of time (S43). This reproduction control signal is converted into information about reproduction condition for performing zoom operation from the one point of time to the another point of time (S44). When the user performs reproduction with slow speed, a reproduction control signal is generated to indicate that the user performed reproduction with slow speed from one point of time to another point of time (S43). This reproduction control signal is converted into information about reproduction condition for performing reproduction with slow speed from the one point of time to the another point of time (S44). When the user performs operation for increasing the volume, a reproduction control signal is generated to indicate that the user performed operation for increasing the volume from one point of time to another point of time (S43). This reproduction control signal is converted into information about reproduction condition for increasing the volume from the certain point of time to the another point of time (S44).

In the example explained above, the reproduction control signal is generated based on user operation actually performed by the user during moving image reproduction in the reproduction mode, and the reproduction control converted into the information about reproduction condition. However, the reproduction control signal may be generated irrelevant of operation actually performed by the user. For example, a GUI (Graphical User Interface) may be provided to set user's preference about reproduction, so that information representing the user's preference input with the GUI can be converted into information about reproduction condition.

For example, user's preference, e.g., "muting the sound from one point of time to another point of time", "blurring a portion other than a particular subject in a moving image from one point of time to another point of time", and "applying fade-in and fade-out at scene change", may be set with the GUI. Then, when such user's preference is set with the GUI, information about reproduction condition may be generated based on the set user's preference.

3.2.3 Reproduction Operation in Reproduction Mode

The flowchart of FIG. 6C illustrates process of the digital camera 100 for reproducing a moving image in the reproduction mode according to the second example of operation. Steps S51 to S54 of the flowchart of FIG. 6C respectively correspond to steps S21 to S24 of the flowchart of FIG. 5B. The detailed explanation for those steps is already made and therefore the description thereabout is omitted here.

According to the AVCHD standard, the image/audio signals (moving image file) are stored to STREAM folder. The information about reproduction condition is associated with the moving image file stored in STREAM folder and recorded to MakersInformation area or MakersPrivateData area, as extension information area, included in the block "blkExtensionData( )" of the playlist file stored in PLAYLIST folder. In this manner, the information about reproduction condition is recorded to the playlist file (management file), separating from the image/audio signals (moving image file). Therefore, it can be configured to enable selection whether the information about reproduction condition is used or not at start of reproduction when a moving image is reproduced in the reproduction mode.

The digital camera 100 operating according to the flowcharts of FIGS. 6A to 6C can also update the already recorded information about reproduction condition. At this occasion, the digital camera 100 can update not all the information about reproduction condition but a part of the information about reproduction condition. With this configuration, for example, the digital camera 100 can update only the information about reproduction condition about an image signal without updating information about reproduction condition about an audio signal.

The digital camera 100 operating according to the flowcharts of FIGS. 6A to 6C can also delete the already recorded information about reproduction condition. At this occasion, the digital camera 100 can delete not all the information about reproduction condition but a part of information about reproduction condition. With this configuration, for example, the digital camera 100 can delete only the information about reproduction condition about an image signal without deleting information about reproduction condition about an audio signal.

Further, the digital camera 100 operating according to the flowcharts of FIGS. 6A to 6C can also copy information about reproduction condition as information about reproduction condition associated with another moving image file recorded in the same recording medium 205. At this occasion, the digital camera 100 can also copy a part of information about reproduction condition without copying all the information about reproduction condition. Therefore, for example, the digital camera 100 can also copy only the information about reproduction condition about an image signal without copying information about reproduction condition about an audio signal.

Figure 7:
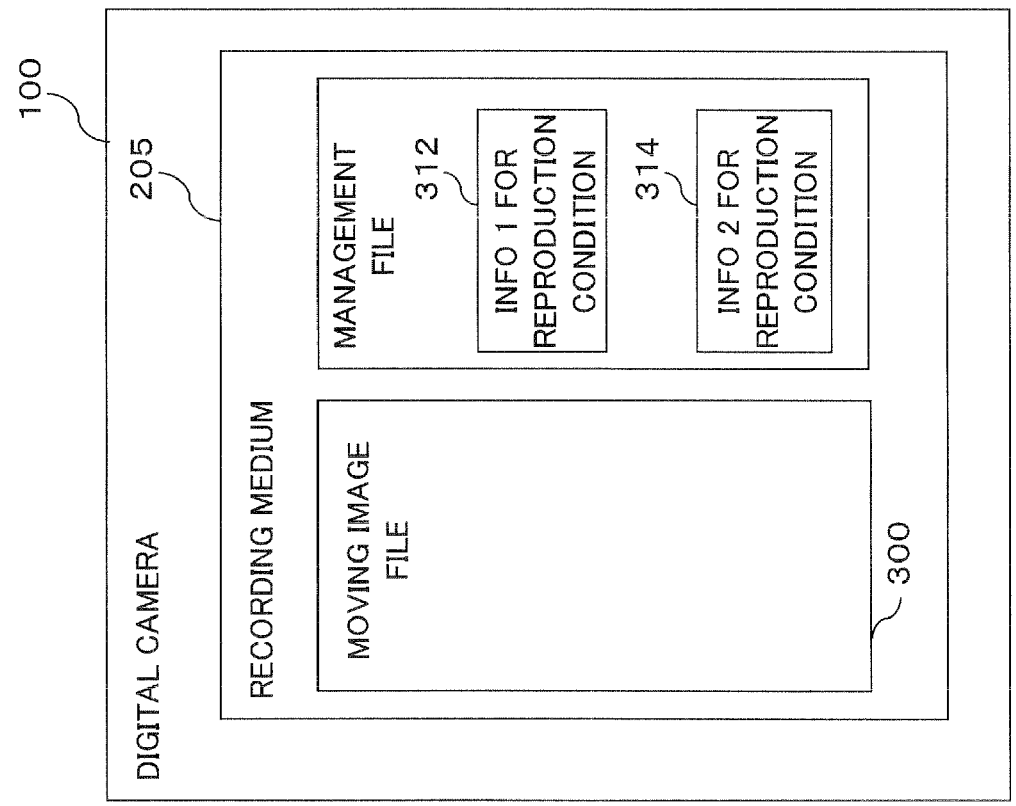
FIG. 7 is a diagram illustrating update, deletion, copy, addition of information about reproduction condition.

Further, the digital camera 100 operating according to the flowcharts of FIGS. 6A to 6C can also record a plurality of pieces of information 312 and 314 about reproduction conditions for one moving image file 300 as shown in FIG. 7. For example, the digital camera 100 can record information about reproduction for the respective users of the digital camera 100 or the respective viewers of a moving image.

It is apparent that a setting as to whether information about reproduction condition is used, an instruction for update, deletion, and copy of information about reproduction condition, an instruction for recording a plurality of pieces of information about reproduction conditions to one moving image file, and the like can be achieved by appropriately designing a GUI and appropriately managing files.

In response to an instruction given by a user, a moving image file may be restructured according to information about reproduction condition recorded in the playlist file (management file).

4. Summary

As described above, the digital camera 100 according to the present embodiment includes the reproduction condition controller 208 for generating a reproduction condition of an image file (*.mts) and recording the reproduction condition to a management file (*.mpl) which is different from the image file while associating the reproduction condition with the image file, and the controller 202 for reproducing the image file while controlling a method of reproducing the image file based on the reproduction condition associated with the image file. The reproduction condition is information representing at least one of image quality adjustment, volume adjustment, display magnification rate, and reproduction speed adjustment.

In this manner, the information about reproduction condition is recorded to the management file which is different from the moving image file, so that the reproduction condition can be set during moving image reproduction without restructuring the moving image file. In addition, the information about reproduction condition can be moved to another recording medium and another apparatus, and a plurality of reproduction conditions can be easily set. Further, since it is not necessary to restructure a moving image file by means of re-encoding, reproduction condition can be easily reflected. Still further, reproduction conditions for a plurality of users can be set.

Other Embodiments

Various kinds of changes and modifications listed below can be applied to the concept of the first embodiment described above.

(1) In the present embodiment, information about reproduction condition is recorded to an extension information area of a playlist file. Alternatively, the information about reproduction condition may be recorded to another area. MakersPrivateData area is reserved as an extension information area in a clip information file recorded in CLIPINF folder which management file provided corresponding to a moving image file. Therefore, the information about reproduction condition may be recorded to the reserved area. By recording the information about reproduction condition to the area, the information about reproduction condition according to time series can be easily recorded.

(2) When the information about reproduction condition is not recorded in a management file during reproduction of a moving image in the reproduction mode, image/audio signals may be reproduced as they are.

(3) The information about reproduction condition may be recoded as a temporary file which is not conformity with AVCHD standard. With this configuration, only the information about reproduction condition can be recorded to the recording medium 205 as a temporary file. In this case, only the information about reproduction condition can be exchanged with an apparatus capable of reading the temporary file and recording it as information about reproduction condition associated with a moving image file in the recording medium 205.

(4) In the present embodiment, the information about reproduction condition is recorded to a management file which is different from a moving image file. Therefore, a plurality of pieces of information about reproduction conditions can be set in a single moving image file. Thus, the digital camera 100 operating according to the flowcharts of FIGS. 5A to 5B may set a plurality of pieces of information about reproduction conditions to a single moving image file. In this configuration, information about reproduction conditions for a plurality of users can be recorded.

(5) In the present embodiment, reproduction condition is set for a moving image file. The reproduction condition may be set not only for a moving image file but also for a still image file. In a case of a still image, the reproduction condition is considered to specify adjustment of image quality (such as brightness, color, and white balance) during reproduction of the still image. For example, when a person's face is included in a still image, reproduction condition may be set to perform color correction so as to reproduce beautiful flesh color in the image region including the person's face.

(6) In the first embodiment, the digital camera has been explained as one example of a moving image recording/reproduction apparatus. Alternatively, the concept of the first embodiment can be applied to an apparatus (hereinafter referred to as "a moving image reproduction apparatus") dedicated for reproduction of a moving image without any moving image shooting function, such as a photo viewer, a photo frame, and a television receiver, and a portable music player capable of reproducing a moving image file.

The moving image reproduction apparatus is different from the moving image recording/reproduction apparatus (digital camera 100) in that, when recording image/audio signals in the moving image recording mode, the moving image reproduction apparatus cannot analyze the image/audio signals to extract a reproduction control signal suitable for reproduction, convert the extracted reproduction control signal into information about reproduction condition, neither record the information to the recording medium 205.

However, analyzing of the image/audio signals may be performed during reproduction of the moving image. Therefore, during reproduction of the moving image, the moving image reproduction apparatus can analyze the image/audio signals, extract a reproduction control signal suitable for reproduction, convert the extracted reproduction control signal into information about reproduction condition, and record the information to the recording medium 205. From these, it is understood that the functions of the moving image recording/reproduction apparatus explained using the example of the digital camera 100 in the first embodiment can also be applied to the moving image reproduction apparatus in the same manner.

(7) Further, the concept of the first embodiment can also be applied to an image editing apparatus having an image editing function in the same manner. During editing of an image file, a reproduction condition can be attached to the image file that has been shot and recorded in a recording medium. In other words, the concept as shown in the first embodiment can be applied to an image processing apparatus for recording, reproducing, and/or editing an image file.

(8) The functions of the moving image recording apparatus and the like can also be achieved with a computer and software executed by the computer.

Industrial Applicability

With the above stated embodiments, a reproduction condition of an image (such as a moving image and a still image) can be set without editing the body of an image file. Therefore, the above stated embodiments are useful for an image recording apparatus such as a digital camera and a video camera, an image reproduction apparatus such as a photo viewer, a photo frame, a television receiver, and a portable music player, and an image editing apparatus such as a personal computer.

What is claimed is:

1. An image processing apparatus comprising:
a reproduction condition generator configured to generate a reproduction condition of a single image file;
a reproduction condition recording unit configured to record the reproduction condition to a management file which is different from the single image file while associating the reproduction condition with the single image file; and
a reproduction unit for reproducing the single image file while controlling a reproduction method of the single image file based on the reproduction condition associated with the single image file,
wherein the reproduction condition is information representing at least one of image quality adjustment, volume adjustment, display magnification rate, and reproduction speed adjustment.

2. The image processing apparatus according to claim 1, further comprising an operation unit with which a user performs operation, wherein the reproduction condition generator generates the reproduction condition based on operation performed with the operation unit during reproduction of the single image file.

3. The image processing apparatus according to claim 1, wherein the reproduction condition generator generates the reproduction condition based on an image signal and/or an audio signal included in the single image file during reproduction of the single image file.

4. The image processing apparatus according to claim 1, wherein the reproduction condition generator generates the reproduction condition based on shooting information which is recorded in association with the single image file.

5. The image processing apparatus according to claim 4, wherein the shooting information includes a shutter speed and/or an aperture value for recording of the single image file.

6. The image processing apparatus according to claim 1, further comprising an input unit configured to input information from outside, wherein the reproduction condition generator generates the reproduction condition based on information input via the input unit.

7. The image processing apparatus according to claim 1, wherein the recording unit records the reproduction conditions while associating a plurality of reproduction conditions with the single image file.

8. The image processing apparatus according to claim 1, further comprising image recording unit configured to record, to a recording medium, the single image file that is generated by capturing an image of a subject.

9. The image processing apparatus according to claim 1, wherein the single image file is a moving image file.

10. A non-transitory computer-readable recording medium storing an image processing program for causing a computer to execute the functions of:
generating a reproduction condition of a single image file;
recording the reproduction condition to a management file which is different from the single image file while associating the reproduction condition with the single image file; and
reproducing the single image file while controlling a reproduction method of the single image file based on the reproduction condition associated with the single image file,
wherein the reproduction condition is information representing at least one of image quality adjustment, volume adjustment, display magnification rate, and reproduction speed adjustment.

* * * * *